United States Patent
Wenstrand

[11] Patent Number: 6,158,388
[45] Date of Patent: Dec. 12, 2000

[54] WATERING ATTACHMENT FOR CAGE FOR BABY FOWL

[76] Inventor: Thomas W. Wenstrand, 1702 Oakland Mills Rd., Mount Pleasant, Iowa 52641

[21] Appl. No.: 09/298,861

[22] Filed: Apr. 26, 1999

[51] Int. Cl.[7] .................................................. A01K 39/02
[52] U.S. Cl. .................... 119/464; 119/454; 119/475; 119/72; 119/77; 222/165; 222/167
[58] Field of Search .................... 119/454, 456, 119/457, 464, 475, 476, 477, 72, 77, 51.5, 467; 222/167, 164, 165, 166

[56] References Cited

U.S. PATENT DOCUMENTS

| | | | |
|---|---|---|---|
| 1,239,151 | 9/1917 | Woods | 119/464 |
| 1,446,740 | 2/1923 | Eummelen | 119/464 |
| 1,450,494 | 4/1923 | Eummelen | 119/464 |
| 1,755,706 | 4/1930 | St. George | 119/464 |
| 3,217,939 | 11/1965 | Murray | 222/167 |
| 3,589,338 | 6/1971 | Lovitz | 119/51.01 |
| 4,450,788 | 5/1984 | Niki | 119/477 |
| 4,762,086 | 8/1988 | Atchley | 119/477 |
| 5,353,742 | 10/1994 | Mauritz | 119/77 |
| 5,740,759 | 4/1998 | Cummings | 119/72 |

*Primary Examiner*—Michael J. Carone
*Assistant Examiner*—James S. Bergin
*Attorney, Agent, or Firm*—Robert A. Brown; Lucas J De Koster

[57] ABSTRACT

A device for providing water to young birds and fowl. The waterer is attached to a cage for the birds and includes a bottle which can be detached for cleaning or replacement and reattached when full without any spillage. The device also includes a removable piece for the prevention of drowning of certain types of game birds.

10 Claims, 1 Drawing Sheet

WATERING ATTACHMENT FOR CAGE FOR BABY FOWL

BACKGROUND AND SUMMARY OF THE INVENTION

This invention pertains to watering devices particularly useful on cages for all types of fowl. Many hunting clubs, hobbyists and bird fanciers, in order to be reasonably certain of an adequate supply of birds, raise birds in a controlled environment. The very young birds immediately, or a least very soon after hatching, are placed in cages where they are fed and watered until they are large enough and old enough to be released to larger pens.

Water for such birds is often provided by some type of automatic waterer so that there is always water available. Such watering devices often use bottles of water as part of the source of supply of the water for the birds. The bottles usually are filled in an upright position and are then inverted so the neck of the bottle is down, and the outlet inserted into some kind of trough or the like to be made available to the birds.

Simply turning the bottle over to insert its outlet into a holder on the trough often leads to undesired spillage and may require mopping up of the spill. By the present invention, the bottle is attached before it is inverted, thus avoiding spillage.

Additional advantages of the present device include a method of leveling the bottle and trough even if the cage is placed on a somewhat uneven surface, and also a removable device for the prevention of drowning of some birds particularly quail—where the infant birds seek a moist environment and are easily drowned in shallow water. Finally, the present device is self cleaning. Each time the trough is inverted, any foreign material falls into the bottom of the cage, usually into a collection tray.

DESCRIPTION

Briefly, this invention comprises an easy and convenient waterer device for use with cages for birds and fowl in their infancy. The device is efficient and safe for the birds as well as convenient for the bird-raisers.

Figure 1:
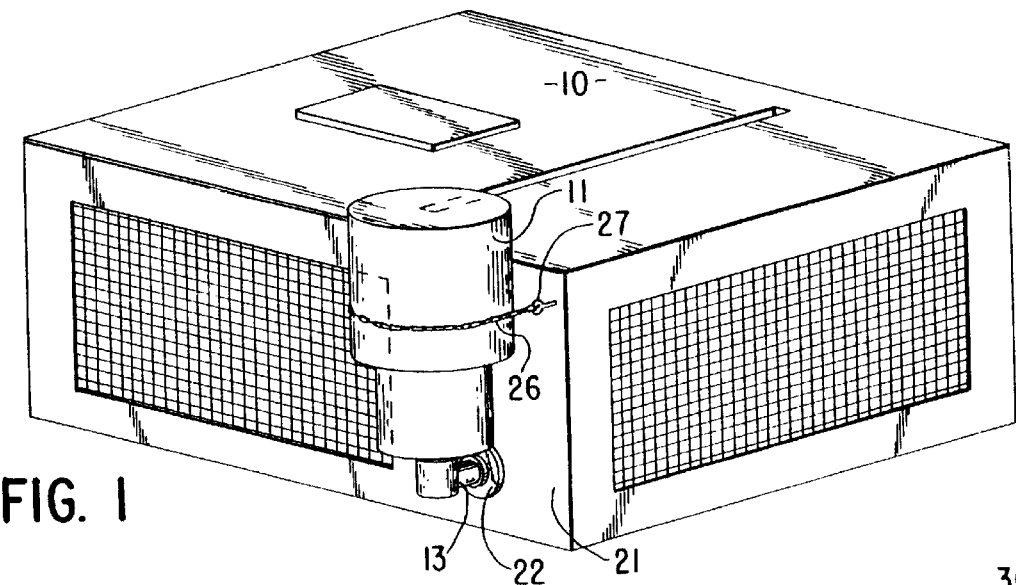
FIG. 1 is a perspective view of a cage with the waterer attached.

More particularly, and with reference to the drawings, the cage 10 in which the birds are kept is shown in FIG. 1. The watering device including its bottle 11 or other container is shown at one corner of the cage.

The waterer comprises principally a supply container or bottle 11 attached to a trough-like device 13 adapted to receive the bottle and to extend into the cage 10. This trough-like device 13 includes a receptacle 14 into which the neck 15 of the bottle will extend. This neck is normally a smooth fit into a socket 16 in the receptacle 14. However, it is envisioned that a rubber-like washer or bushing around the neck of the bottle could be used to provide added assurance against leakage at this point. It also would be possible to use a bottle with screw threads formed in its neck and that those could be threadably engaged with matching threads on the receptacle 14. Those latter expedients are well known in the art and therefore are not specifically shown.

The container may obviously be formed of sheet metal, glass or plastic. The preference may be for a transparent glass or plastic so that the level of contents in the interior may be observed. However the structure and material may be widely varied as will be obvious to those skilled in the art.

An entrance pipe 20 extends at substantially a right angle from the socket 16. This pipe extends from the exterior of the cage to the interior through a wall 21 of the cage.

At the inner end of the pipe 20, a short length of the pipe is opened to provide a trough-like formation 23. A slot 24 extending longitudinally from the formation 23, through the upper part of the pipe may also be provided for a use to be explained later.

The neck 15 should not be inserted into the receptacle 14 beyond a certain distance. Controlling this distance will control the depth of the liquid in the trough-like formation. This principal has been used for a great many years in poultry waterers and the like since at least the nineteenth century. However, in order to provide for a limitation of the degree of insertion of the neck 15, the receptacle 14 is provided with a plurality (preferably three) of stop blocks 18. These blocks are positioned to engage the neck 15 as it is inserted, and thus to limit the insertion to the proper depth.

To provide stability for the entrance pipe 20 as it extends through the wall 21, a certain length of the pipe should be supported. That could be done by a simple bushing. However, it is preferred to use a matched pair of washers 22 and 22' having an inner diameter which is a snug fit with the outer diameter of the pipe 20.

Figure 3:
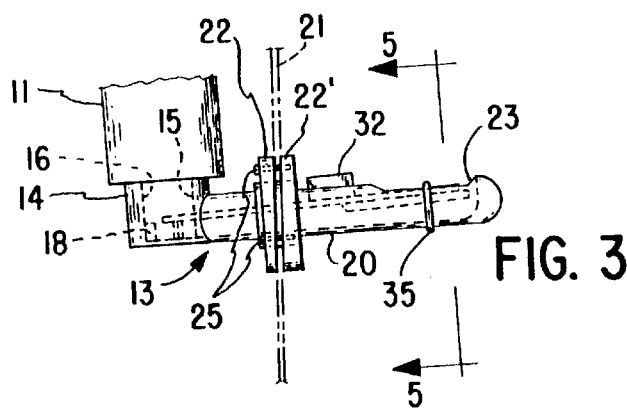
FIG. 3 is a side elevational view of the waterer with the cage and bottle shown in phantom lines in the use position.
Figure 5:
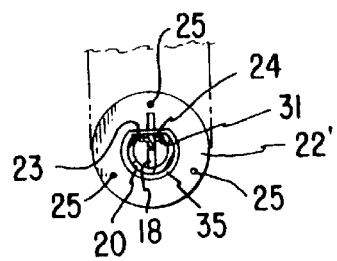
FIG. 5 is a sectional view from line 5—5 of FIG. 3.
Figure 4:
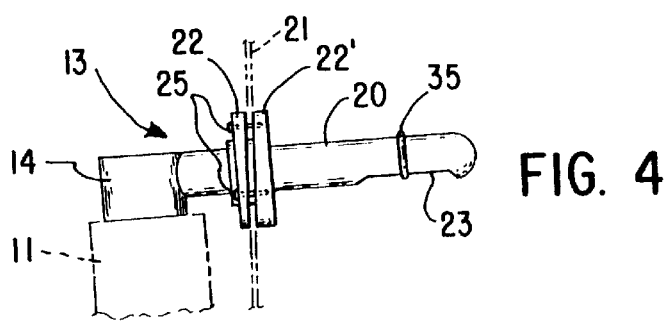
FIG. 4 is a view similar to FIG. 3 with the waterer shown in the refilling position.

The washer 22 and 22' are somewhat different from the ordinary. Although they are very similar to each other, they are in fact a matched pair being tapered along one diametrical direction so the washer is at one end of the diameter thicker than at the other. Thus, the two washers can be laid together to form a relatively thick combined washer of uniform thickness, although each individual washer is tapered along that diameter. (See FIGS. 3 and 4) Thus, the equivalent of a bushing is provided. Screws 25 may extend through the first of the pair of washers 22 and 22' and be threaded into the second of the pair to provide clamping of the washers onto the wall 21 of the cage and thus to hold the assembly onto the cage. The tapered formation allows the washers to provide a slightly tilted axis of the central opening, so that the pipe 20 will be at an angle to the wall 21 of the cage slightly different from a right angle. On a substantially flat setting, that tilt might let the pipe 20 run down into the cage. On a tilted surface, the washers could be turned before being fastened so as to provide a mechanism to compensate for the tilt of the cage.

Figure 2:
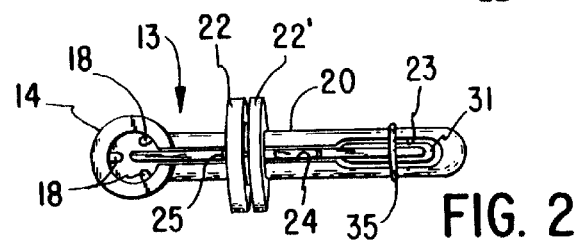
FIG. 2 is a top plan view of the waterer removed from the cage and with the bottle removed.

Along the diameter perpendicular to the sloped diameter of the pair of washers 22 and 22', the washer may be formed into a very shallow V-shape (note FIG. 2). This formation will, upon clamping onto its wall 21 provide a slight deformation of the wall and therefore a more secure positioning of the washers.

To assemble the device, the first step may be to determine whether the cage 10 will be sloped or not. The angle of orientation of the washers 22 and 22' can then be determined and the washers clamped in place at the opening provided for the waterer in the wall 21 of the cage. The pipe can then be simply slipped into place in the opening provided. The bottle 11 is filled and pressed upwardly into the opening in the receptacle 14 in the inverted pipe. The bottle and pipe can then be turned to an upright position where the bottle 11 will be held in place by a chain 26, or other means such as a heavy elastic band, bungee cord or the like, wrapped around the bottle and fastened to the wall 21 by I-bolts 27 or the equivalent. Thus, the bottle 11 will be held in an inverted position in which the contents will keep the receptacle 14 filled, and thus keep the trough 23 supplied with water.

It should be noted that each time the trough 23 is turned to the inverted position, that any extraneous material in the trough will be dumped from the trough. Thus, the trough is essentially self-cleaning. A catching device in the cage may be used to catch and hold such extraneous material.

Figure 6:
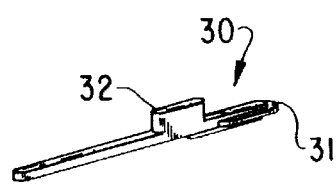
FIG. 6 is perspective view of the removable, anti-drowning device.

Some infant birds, notably quail, are often so thirsty that they will press their beaks into the trough 23 so deeply as to cover the nares in the beak and therefore to drown. To avoid that deep dipping of the beak, an auxiliary device may be provided. That device shown separately in FIG. 6, is essentially a filler 30. The filler consists principally of a paddle-shaped end 31 adapted to fill the opening at the top of the trough 23.

The filler 30 is extended so as to reach back into the pipe 20. This tends to hold the filler in position so as to fully block the trough when the filler is needed. A vane 32 on the filler also extends through the slot 24 in the pipe 20. This orients the filler so as to hold it properly in place when it is needed. An O-ring 35 of rubber or similar resilient material surrounds the pipe 20 to hold the filler in place particularly when the bottle 11 is removed for filling and is then replaced.

From the foregoing description, it will be apparent that the invention does provide a watering device which is convenient to use in connection with a cage for birds including baby quail and others which might otherwise drown themselves.

What is claimed is:

1. In combination with a cage for birds, fowl, or the like, said cage having walls with inner and outer surfaces, a liquid supplying device including a pipe-like part extending through a wall of said cage, said pipe-like part being movable relative to said wall, said pipe-like part having one end extending outside said wall and a second end within said cage, said one end including container-attachment means for receiving the neck of a container, a container having a neck removably placed in said attachment means whereby the contents of said container will drain into said pipe-like part, said pipe-like part being moveable from an attaching position in which said neck extends upwardly into said attachment means to a use position in which said neck extends downwardly to drain into said pipe-like part, said pipe-like part being formed to provide a trough situated within said cage.

2. The combination of claim 1 in which fastening means is provided on said wall and is engagable with said container to hold said container in said use position.

3. The combination of claim 1 in which said pipe-like part is tiltably rotatable relative to said wall to provide for movement from said attachment position to said use position.

4. The combination of claim 1 in which said pipe-like part includes means for blocking said second end, said pipe-like part having a portion open to provide said trough.

5. The combination of claim 1 in which an inner washer is engaged with said inner surface and an outer washer is engaged with said outer surface opposite to said inner washer, said inner and outer washers being formed with an opening through which said pipe-like part extends.

6. The combination of claim 5 in which said washers each have a sloping surface, said sloping surfaces being matched so that said opening is tilted relative to an axis perpendicular to said wall.

7. The combination of claim 6 in which said washers include means for slightly deforming said wall whereby said washers are held in said wall in matched relationship.

8. The combination of claim 1 in which longitudinally extended blocking means for partially blocking said trough is removeably engaged in said pipe-like part, said blocking means being effective to prevent insertion of the beak of a bird into said trough beyond a limited depth.

9. The combination of claim 8 in which said blocking means includes a vane on said blocking means, said pipe-like part being formed to engage said vane to hold said blocking means in proper position.

10. The combination of claim 8 in which a ring surrounds said pipe-like part at the location of said trough, said ring being thereby effective to hold said blocking means within said pipe-like part.

\* \* \* \* \*